United States Patent
Scuderi et al.

(10) Patent No.: US 7,353,786 B2
(45) Date of Patent: Apr. 8, 2008

(54) SPLIT-CYCLE AIR HYBRID ENGINE

(75) Inventors: Salvatore C. Scuderi, Westfield, MA (US); Stephen P. Scuderi, Westfield, MA (US)

(73) Assignee: Scuderi Group, LLC, West Springfield, MA (US)

( * ) Notice: Subject to any disclaimer, the term of this patent is extended or adjusted under 35 U.S.C. 154(b) by 138 days.

(21) Appl. No.: 11/326,909

(22) Filed: Jan. 7, 2006

(65) Prior Publication Data
US 2007/0157894 A1 Jul. 12, 2007

(51) Int. Cl.
*F02B 33/00* (2006.01)

(52) U.S. Cl. .......................... 123/68; 123/53.5; 60/712

(58) Field of Classification Search ............... 123/53.1, 123/53.5, 68, 70 R; 60/597, 653, 668, 698, 60/706, 712, 727, 729
See application file for complete search history.

(56) References Cited

U.S. PATENT DOCUMENTS

| | | | |
|---|---|---|---|
| 1,062,999 A | | 5/1913 | Webb |
| 4,418,657 A | * | 12/1983 | Wishart ........................ 123/68 |
| 4,696,158 A | | 9/1987 | DeFrancisco |
| 5,529,549 A | | 6/1996 | Moyer |
| 6,223,846 B1 | | 5/2001 | Schechter |
| 6,415,749 B1 | | 7/2002 | Sturman et al. |
| 6,543,225 B2 | | 4/2003 | Scuderi |
| 6,655,327 B1 | | 12/2003 | Hedman |
| 6,922,997 B1 | | 8/2005 | Larson et al. |
| 6,952,923 B2 | | 10/2005 | Branyon et al. |

OTHER PUBLICATIONS

Andersson et al., An Air Hybrid for High Power Absorption and Discharge, SAE 2005-01-2137.
Tai et al., Using Camless Valvetrain for Air Hybrid Optimization, SAE 2003-01-0038.

* cited by examiner

*Primary Examiner*—Noah P. Kamen
(74) *Attorney, Agent, or Firm*—Fildes & Outland, P.C.

(57) ABSTRACT

A split-cycle air hybrid engine operatively connects an air reservoir to a split cycle engine. A power piston is received within a power cylinder and operatively connected to a crankshaft such that the power piston reciprocates through an expansion stroke and an exhaust stroke during a single revolution of the crankshaft. A compression piston is received within a compression cylinder and operatively connected to the crankshaft such that the compression piston reciprocates through an intake stroke and a compression stroke in a single rotation of the crankshaft. The compression cylinder is selectively controllable to place the compression piston in a compression mode or an idle mode. An air reservoir is operatively connected between the compression cylinder and the power cylinder and selectively operable to receive compressed air from the compression cylinder and to deliver compressed air to the power cylinder for use in transmitting power to the crankshaft during engine operation.

34 Claims, 6 Drawing Sheets

SPLIT-CYCLE AIR HYBRID ENGINE

TECHNICAL FIELD

This invention relates to split-cycle engines and, more particularly, to such an engine incorporating an air hybrid system.

BACKGROUND OF THE INVENTION

The term split-cycle engine as used in the present application may not have yet received a fixed meaning commonly known to those skilled in the engine art. Accordingly, for purposes of clarity, the following definition is offered for the term split-cycle engine as may be applied to engines disclosed in the prior art and as referred to in the present application.

A split-cycle engine as referred to herein comprises:
a crankshaft rotatable about a crankshaft axis;
a power piston slidably received within a power cylinder and operatively connected to the crankshaft such that the power piston reciprocates through a power (or expansion) stroke and an exhaust stroke during a single rotation of the crankshaft;
a compression piston slidably received within a compression cylinder and operatively connected to the crankshaft such that the compression piston reciprocates through an intake stroke and a compression stroke during a single rotation of the crankshaft; and
a gas passage interconnecting the power and compression cylinders, the gas passage including an inlet valve and an outlet (or crossover) valve defining a pressure chamber therebetween.

For purposes of clarity, the following is a list of acronyms for the various engine operating modes described herein:
AC Air compressor;
AM Air motoring;
CB Compression braking;
ICE Internal combustion engine;
PAP Pre-compressed air power;
PCA Pre-compressed combustion air.

U.S. Pat. No. 6,543,225 B2, U.S. Pat. No. 6,609,371 B2 and U.S. Pat. No. 6,952,923, all assigned to the assignee of the present invention, disclose examples of split-cycle internal combustion engines as herein defined. These patents contain an extensive list of United States and foreign patents and publications cited as background in the allowance of these patents. The term "split-cycle" has been used for these engines because they literally split the four strokes of a conventional pressure/volume Otto cycle (i.e., intake, compression, power and exhaust) over two dedicated cylinders: one cylinder dedicated to the high pressure compression stroke, and the other cylinder dedicated to the high pressure power stroke.

Considerable research has been recently devoted to air hybrid engines as compared, for example, to electric hybrid systems. The electric hybrid system requires the addition to the conventional four stroke cycle engine of batteries and an electric generator and motor. The air hybrid needs only the addition of an air pressure reservoir added to an engine incorporating the functions of a compressor and an air motor, together with the functions of a conventional engine, for providing the hybrid system benefits. These functions include storing pressurized air during braking and using the pressurized air for driving the engine during subsequent starting and acceleration.

However, the prior art appears to involve only adapting a conventional four stroke cycle engine to perform the compression, combustion and motoring functions in a single cylinder. This, then, requires a complex valve and drivetrain system and control which is capable of switching from a compression-braking (CB) mode to an air motoring (AM) mode and back to a conventional internal combustion engine (ICE) mode during operation.

In a typical example, when not storing or utilizing compressed air to drive the vehicle, a prior art air hybrid engine operates as a conventional internal combustion engine, where the four strokes of the Otto cycle (intake, compression, power and exhaust) are performed in each piston every two revolutions of the crankshaft. However, during the compression-braking mode, each cylinder of the conventional engine is configured to operate as a reciprocating piston two-stroke air compressor, driven from the vehicle wheels by vehicle motion. Air is received from outside atmosphere into the engine cylinders, compressed there, and displaced into an air-reservoir. Work performed by the engine pistons absorbs the kinetic energy of the vehicle and slows it down or restricts its motion. In this way the kinetic energy of the vehicle motion is transformed into energy of compressed air stored in the air reservoir.

During the air motoring mode, each cylinder of the engine is configured to utilize the stored compressed air to produce power strokes for propulsion without combustion. This may be accomplished by first expanding the stored, compressed air into the cylinders to drive the pistons down from top dead center (TDC) to bottom dead center (BDC) for a first power stroke. Then the pistons compress the expanded gas as they travel from BDC to TDC. Fuel is then injected into the cylinders and ignited just before TDC. The expanding products of combustion then drive the pistons down again for a second power stroke on the second revolution of the crankshaft.

Alternatively, air-motoring may be accomplished by expanding the stored compressed air to drive the power piston down from TDC to BDC for a power stroke without combustion for each revolution of the crankshaft. This alternative method of air motoring may continue until the pressure in the air reservoir falls below a threshold level, whereupon the engine may switch to either the previously described air motoring mode or a conventional ICE engine mode of operation.

Problematically, in order to switch among the CB, AM and ICE modes, the valve/drive train system becomes complex, costly and hard to control or maintain. Additionally, since each cylinder must perform all of the functions for each mode, they cannot be optimized easily. For example, the pistons and cylinders must be designed to withstand an explosive combustion event, even when just acting as an air compressor. Accordingly, due to the tolerances and materials required to withstand the heat of combustion, some sacrifice must be made to the efficiency of the compressor mode.

Another problem with performing all functions for each mode (ICE, CB and AM) in every cylinder is that no two modes can be performed in parallel (i.e. simultaneously). Because prior art air hybrid systems utilize conventional engines, they are restricted to operating in each mode serially, which imposes inherent limitations on their capabilities. For example, because the CB mode cannot be utilized when the engine is operating as an internal combustion engine (in ICE mode), the air reservoir can only be charged during the braking function of a moving vehicle. This limitation leads to problems in maintaining the stored charge in the air reservoir. Additionally, this limitation also means that prior art air hybrid systems are only applicable to moving vehicles, and are not practical for stationary applications such as stationary generators.

SUMMARY OF THE INVENTION

The present invention combines the features of the split cycle engine with the air reservoir of the air hybrid concept and various simplified control features to provide novel arrangements for operation and control of the resulting hybrid engine embodiments. A distinct advantage of the invention is that two or more engine modes as described herein can be operated simultaneously (i.e., in parallel), because the split-cycle engine includes dedicated compression and power pistons.

Taken as a broad concept, a split-cycle air hybrid engine according to the invention preferably includes:

a crankshaft rotatable about a crankshaft axis;

a power piston slidably received within a power cylinder and operatively connected to the crankshaft such that the power piston reciprocates through an expansion (or power) stroke and an exhaust stroke during a single rotation of the crankshaft;

a compression piston slidably received within a compression cylinder and operatively connected to the crankshaft such that the compression piston reciprocates through an intake stroke and a compression stroke during a single rotation of the crankshaft, the compression cylinder being selectively controllable to place the compression piston in a compression mode or an idle mode;

an air reservoir operatively connected between the compression cylinder and the power cylinder and selectively operable to receive compressed air from the compression cylinder and to deliver compressed air to the power cylinder for use in transmitting power to the crankshaft during engine operation; and valves selectively controlling gas flow into and out of the compression and power cylinders and the air reservoir.

Alternatively, the power cylinder may also be selectively controllable to place the power piston in a power mode or an idle mode.

For purposes herein, when the compression piston is placed in idle mode, it means that for a single rotation of the crankshaft, the total amount of net negative work (opposing the direction of rotation of the crankshaft) performed on the crankshaft by the compression piston is negligible. Typically, negligible work in the compression piston's idle mode would be less than 20% of the negative work performed on the crankshaft had the compression piston been in its compression mode.

Additionally for purposes herein, when the power piston is placed in idle mode, it means that for a single rotation of the crankshaft, the total amount of net positive work (advancing the direction of rotation of the crankshaft) performed on the crankshaft by the power piston is negligible. Typically, negligible work in the power piston's idle mode would be less than 20% of the positive work performed on the crankshaft had the power piston been in its power mode.

In general, an engine according to the invention is capable of operation in at least three modes, including an internal combustion engine (ICE) mode, an air compressor (AC) mode and a pre-compressed air power (PAP) mode.

In the ICE mode, the compression piston and power piston are typically in their respective compressor and power modes. The compression piston draws in and compresses inlet air for use in the power cylinder. Compressed air is admitted to the power cylinder with fuel shortly after the power piston reaches its top dead center (TDC) position at the beginning of an expansion stroke. The fuel/air mixture is then ignited, burned and expanded on the same expansion stroke of the power piston, transmitting power to the crankshaft. The combustion products are discharged on the exhaust stroke.

In the AC mode, the compression piston is in compression mode and draws in and compresses air which is stored in the reservoir for later use in the power cylinder.

In the PAP mode, the power cylinder is in power mode and receives compressed air from the reservoir which is expanded on the expansion stroke of the power piston, transmitting power to the crankshaft. The expanded air is discharged on the exhaust stroke.

In certain preferred embodiments of the invention, power is developed in the PAP mode in similar fashion to that of the ICE mode. That is, during operation in the PAP mode, fuel is mixed with the compressed air shortly after the power piston has reached its TDC position at the beginning of an expansion stroke. The mixture is ignited, burned and expanded on the same expansion stroke of the power piston, transmitting power to the crankshaft. The combustion products are discharged on the exhaust stroke.

In other alternative embodiments of the engine, power may be developed in the PAP mode in similar fashion to that of the previously described air motoring modes. That is, during operation in the PAP mode, the compressed air admitted to the power cylinder is expanded without adding fuel or initiating combustion.

In a first exemplary embodiment of the engine, the air reservoir comprises a gas passage sized to receive and store compressed air from a plurality of compression strokes, the gas passage interconnecting the compression and power cylinders. The gas passage includes an inlet valve and an outlet valve defining a pressure chamber therebetween.

In a second exemplary embodiment of the engine, a gas passage also interconnects the compression and power cylinders, and the gas passage includes an inlet valve and an outlet valve defining a pressure chamber therebetween. However, the air reservoir is connected by a reservoir passage to the pressure chamber at a location between the inlet valve and the outlet valve.

A third exemplary embodiment of the engine adds a reservoir control valve in the reservoir passage to allow separation of the reservoir from the pressure chamber during ICE operation.

In a fourth exemplary embodiment of the engine, the air reservoir is an accumulator adapted to maintain a relatively constant pressure therein within a predetermined pressure range.

A fifth embodiment of the engine includes multiple pairs of compression and power cylinders interconnected by gas passages having pressure chambers, wherein the pressure chambers are all connected with a single air reservoir.

In a sixth alternative embodiment of the invention, the engine includes a gas passage interconnecting the compression and power cylinders, the gas passage including an inlet valve and an outlet valve defining a pressure chamber therebetween. The air reservoir is connected in parallel with the gas passage, with inlet and outlet connections from the air reservoir to the compression and power cylinders.

These and other features and advantages of the invention will be more fully understood from the following detailed description of the invention taken together with the accompanying drawings.

DETAILED DESCRIPTION OF THE INVENTION

Figure 1:
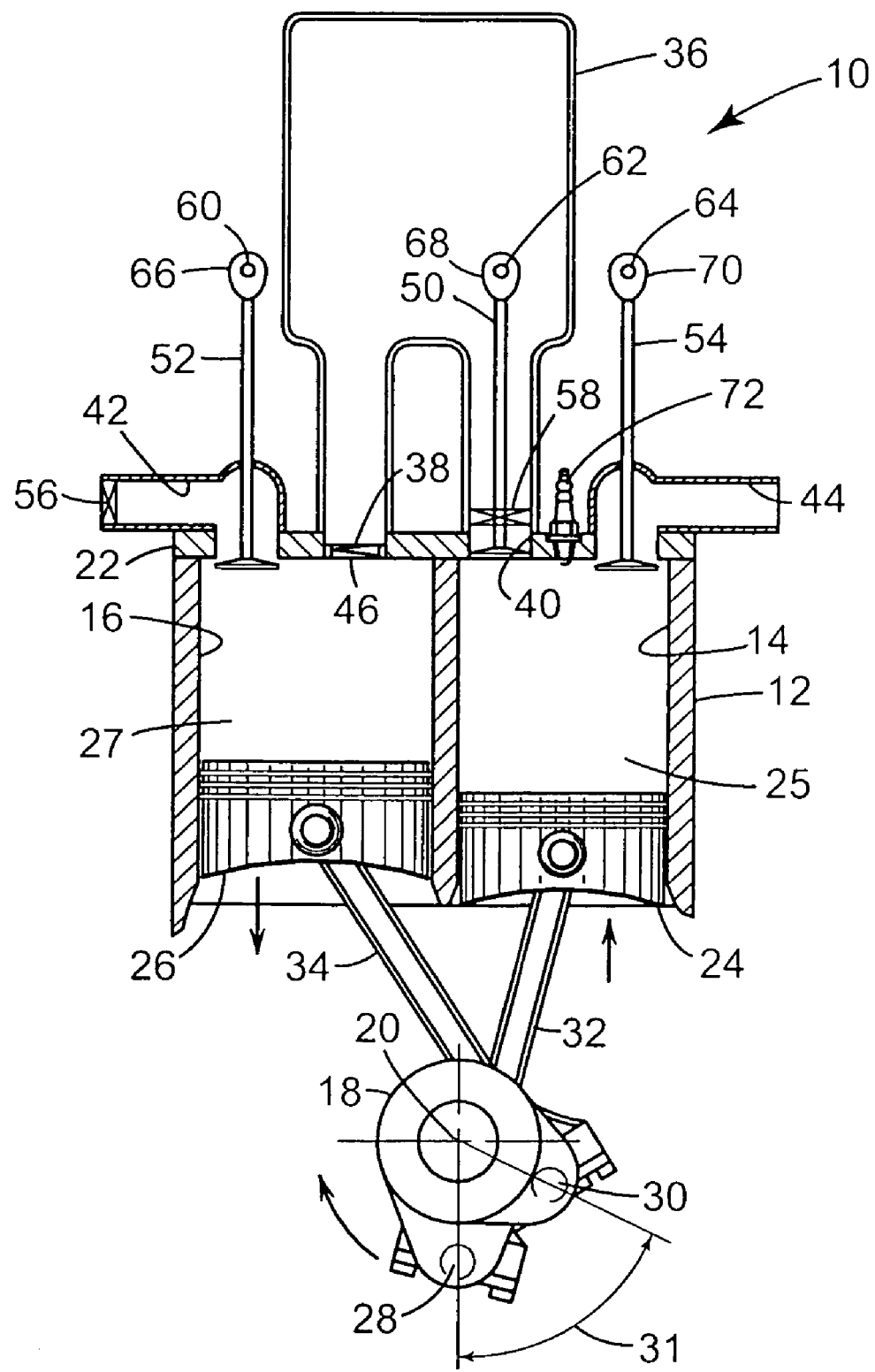
FIG. 1 is a schematic diagram showing a first embodiment of a split-cycle air hybrid engine having an air reservoir and control valves according to the invention.

Referring first to FIG. 1 of the drawings in detail, numeral 10 generally indicates a first exemplary embodiment of a split cycle air hybrid engine according to the invention. Engine 10, shown schematically, is generally of the split-cycle type disclosed in the prior U.S. Pat. Nos. 6,543,225 B2, 6,069,371 B2 and 6,952,923 B2 (Scuderi patents), herein incorporated by reference in their entirety.

As shown, the engine includes an engine block 12 having a first cylinder 14 and an adjacent second cylinder 16 extending therethrough. A crankshaft 18 is journaled in the block 12 for rotation about a crankshaft axis 20, extending perpendicular to the plane of the drawing. Upper ends of the cylinders 14, 16 are closed by a cylinder head 22

The first and second cylinders 14, 16 define internal bearing surfaces in which are received for reciprocation a first power piston 24 and a second compression piston 26, respectively. The cylinder head 22, the power piston 24 and the first cylinder 14 define a variable volume combustion chamber 25 in the power cylinder 14. The cylinder head 22, the compression piston 26 and the second cylinder 16 define a variable volume compression chamber 27 in the compression cylinder 16.

The crankshaft 18 includes axially displaced and angularly offset first and second crank throws 28, 30, having a phase angle 31 therebetween. The first crank throw 28 is pivotally joined by a first connecting rod 32 to the first power piston 24 and the second crank throw 30 is pivotally joined by a second connecting rod 34 to the second compression piston 26 to reciprocate the pistons in their cylinders in timed relation determined by the angular offset of their crank throws and the geometric relationships of the cylinders, crank and pistons.

Alternative mechanisms for relating the motion and timing of the pistons may be utilized if desired. The timing may be similar to, or varied as desired from, the disclosures of the Scuderi patents. The rotational direction of the crankshaft and the relative motions of the pistons near their bottom dead center (BDC) positions are indicated by the arrows associated in the drawings with their corresponding components.

The cylinder head 22 includes any of various passages, ports and valves suitable for accomplishing the desired purposes of the split-cycle air hybrid engine 10. In the illustrated first embodiment, the gas passage/pressure chamber of the previously mentioned patents is replaced by a much larger air reservoir 36 connected to the head 22 through a reservoir inlet port 38 opening into the closed end of the second cylinder 16 and a reservoir outlet port 40 opening into the closed end of the first cylinder 14. As opposed to a smaller gas passage of a type exemplified in the Scuderi patents, the air reservoir 36 is sized to receive and store compressed air energy from a plurality of compression strokes of the compression piston 26. The second cylinder 16 also connects with a conventional intake port 42 and the first cylinder 14 also connects with a conventional exhaust port 44.

Valves in the cylinder head 22, which are similar to valves of the engine in the Scuderi patents, include a reservoir inlet check valve 46 and three cam actuated poppet valves, a reservoir outlet valve (or crossover valve) 50, a second cylinder intake valve 52, and a first cylinder exhaust valve 54. The check valve 46 allows only one way compressed air flow into the reservoir inlet port 38 from the second (compression) cylinder 16. The reservoir outlet valve 50 is opened to allow high pressure air flow from the reservoir 36 into the first (power) cylinder 14.

The present engine 10 includes two additional valves that may be solenoid actuated. These include an intake control valve 56 in the cylinder intake port 42 and a reservoir outlet control valve 58 in the reservoir outlet port 40. These valves may be two position on-off valves but could include variable position controls so that they could be operated as throttle valves if desired.

The poppet valves 50, 52, 54 may be actuated by any suitable devices, such as camshafts 60, 62, 64 having cam lobes 66, 68, 70 respectively engaging the valves 50, 52, 54 for actuating the valves as will be subsequently discussed. Alternatively, the valves 50, 52 and 54, as well as the other valves 46, 56 and 58, may be electronically, pneumatically or hydraulically actuated.

A spark plug 72 is also mounted in the cylinder head with electrodes extending into the combustion chamber 25 for igniting air-fuel charges at precise times by an ignition control, not shown. It should be understood that the engine may be made as a diesel engine and be operated without a spark plug if desired. Moreover, the engine 10 may be designed to operate on any fuel suitable for reciprocating piston engines in general, such as hydrogen or natural gas.

FIGS. 2 through 6 of the drawings disclose various alternative embodiments which are variations of the engine 10 of FIG. 1 and are described below. Operation of all six of the exemplary embodiments will be described thereafter.

Figure 2:
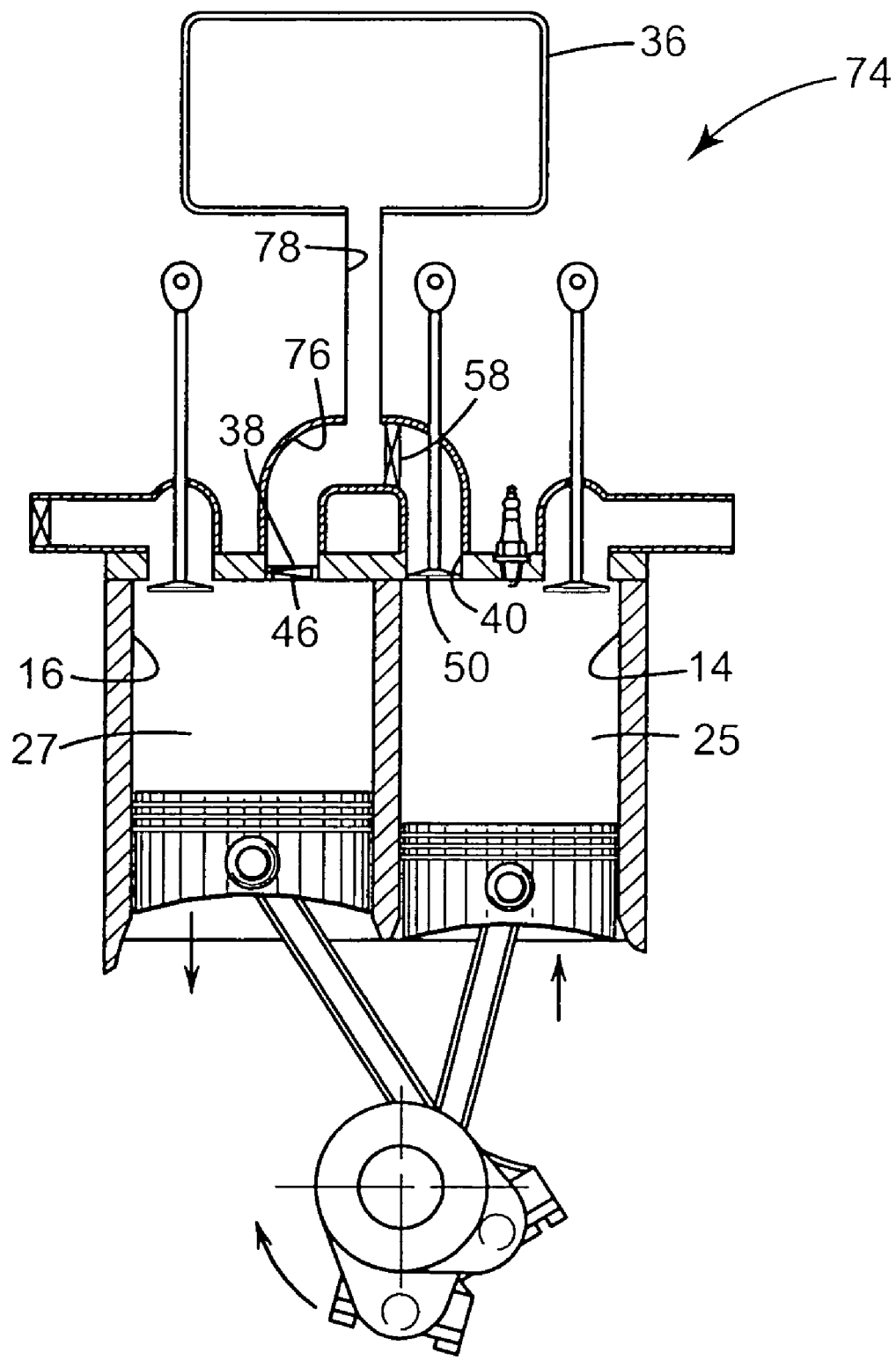
FIG. 2 is a view similar to FIG. 1 but showing a second embodiment with a separate crossover (or gas) passage connected with the air reservoir and an added control valve.

Referring to FIG. 2, s second embodiment of engine 74 is disclosed wherein like reference numerals indicate like parts. Engine 74 is generally similar to engine 10, but differs in that a small volume crossover (or gas) passage 76 is connected between the inlet port 38 and inlet check valve 46 at one end and the outlet port 40 and outlet valve 50 at an opposite end. This crossover passage 76 extends between the compression chamber 27 in the second cylinder 16 and the combustion chamber 25 in the first cylinder 14 and is similar to the crossover passage in the prior Scuderi patents. As opposed to an air reservoir, this crossover passage 76 is not sized to store a substantial amount of compressed air energy for later use. Rather the passage 76 is typically designed to be as small as practically possible for the most efficient transfer of compressed gas during the ICE mode of the engine 74.

In an additional modification, separate air reservoir 36 is connected through a reservoir runner or reservoir passage 78 to the crossover passage 76 and connects to the inlet and outlet ports 38, 40 through the crossover passage 76. The reservoir outlet solenoid control valve 58 is located in the passage 76 between the outlet port 40 and the reservoir runner 78. Valve 58 is open during ICE mode to allow compressed air to follow the path of least resistance and flow primarily through passage 76 into combustion chamber 25. Valve 58 may be closed during AC mode to pump compressed air into reservoir 36 and may be open during PAP mode to retrieve compressed air from the reservoir 36.

Figure 3:
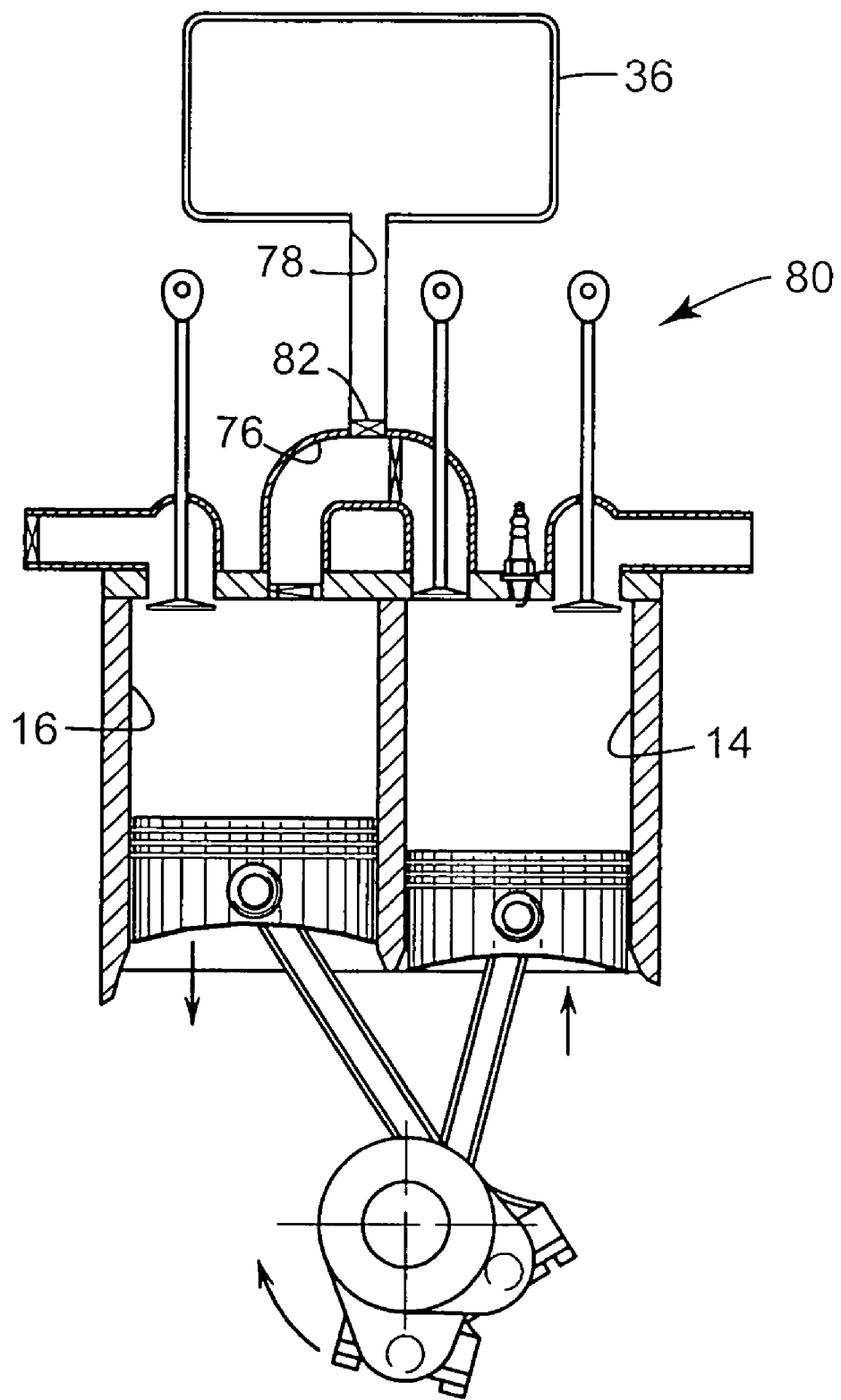
FIG. 3 is a view similar to FIG. 2 but showing a third embodiment with an added reservoir control valve.

Referring now to FIG. 3 of the drawings, a third embodiment of engine 80 is disclosed, which differs from engine 74 in FIG. 3, only in the addition of a third solenoid valve 82. Valve 82 is located in the runner 78 at its junction with the crossover passage 76 to cut off the connection of the air reservoir 36 with the crossover passage when desired.

By isolating the air reservoir 36 via valve 82, the overall engine 80 performance can be more effectively optimized during the ICE mode of operation. For example, during the ICE mode all compressed air can be made to flow through the crossover passage 76. Accordingly, the crossover passage 76 can be designed for the most efficient transfer of gas without interacting with the air reservoir. Additionally valve 82 can also be utilized as a throttling valve for part load conditions during the PAP mode.

Figure 4:
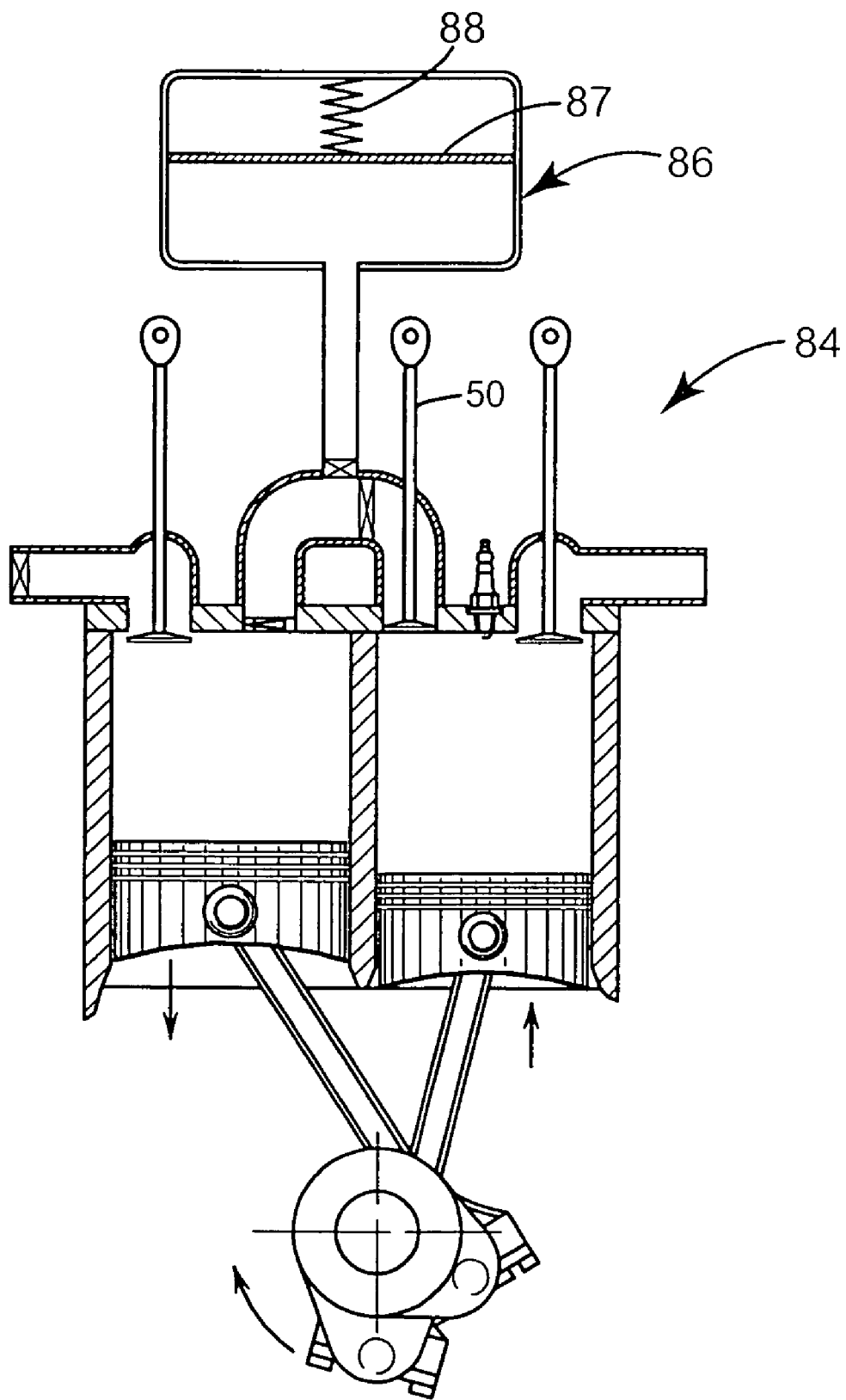
FIG. 4 is a view similar to FIG. 3 but showing a fourth embodiment including a constant pressure accumulator in the air reservoir.

FIG. 4 shows a fourth embodiment of engine 84 similar to the engine 80 of FIG. 3. It differs in the conversion of the air reservoir into a pressure accumulator 86 by the addition of a diaphragm or bladder 87 and spring mechanism 88. These act to pressurize air that is present in the accumulator 86 and to maintain the contents at a relatively constant pressure between conditions where the reservoir is either empty or is filled up to the maximum control pressure.

Figure 5:
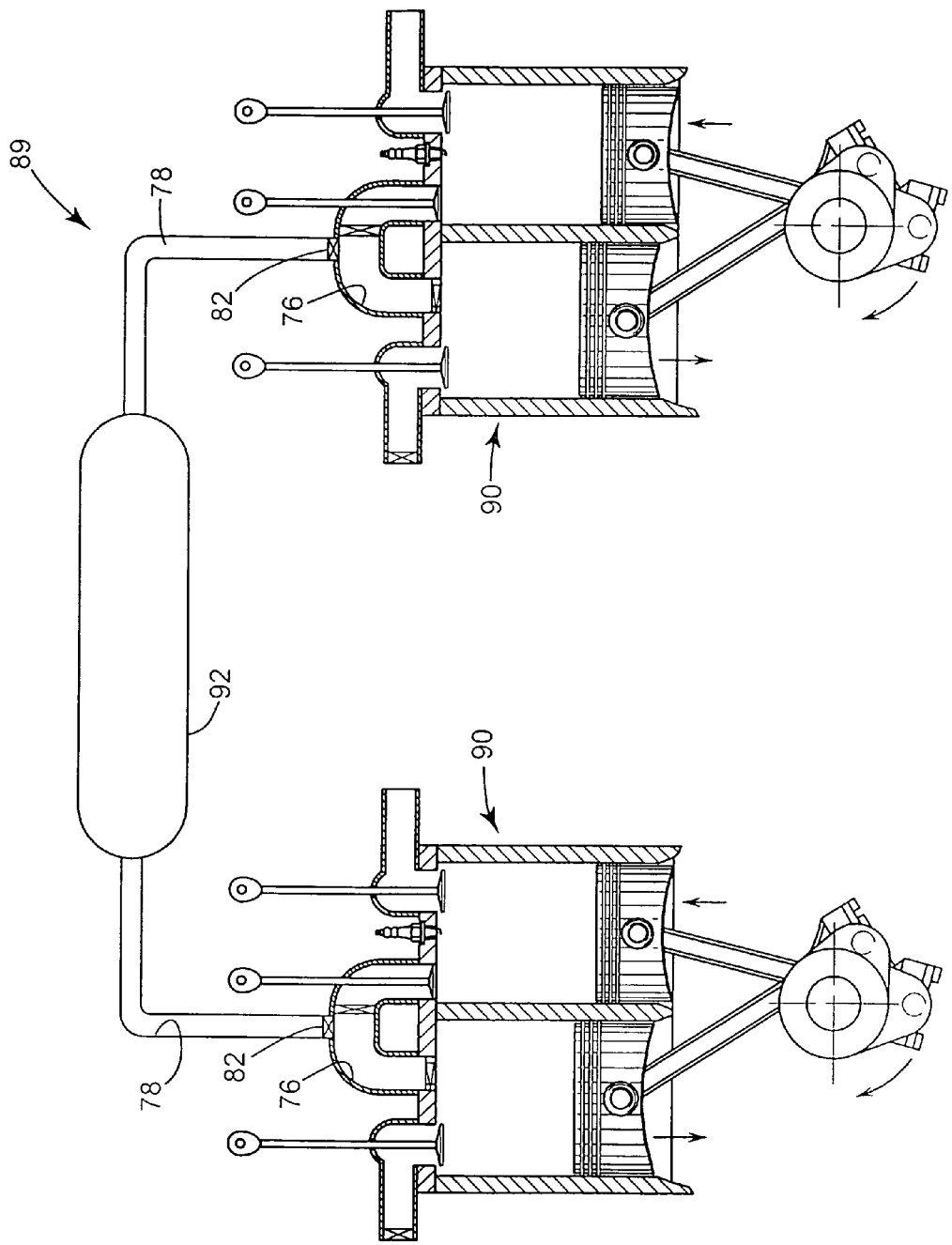
FIG. 5 is a view similar to FIG. 3 showing a fifth embodiment having a common reservoir for multiple cylinder pairs.

FIG. 5 illustrates a fifth embodiment of a multicylinder engine 89 having at least two cylinder pairs 90, each equivalent to the engine 80 of FIG. 3. Engine 89 is modified to include a common supply reservoir 92 that is joined to crossover passages 76 of, all the cylinder pairs with a reservoir control solenoid valve 82 controlling communication of each reservoir runner 78 with its respective crossover passage 76.

Figure 6:
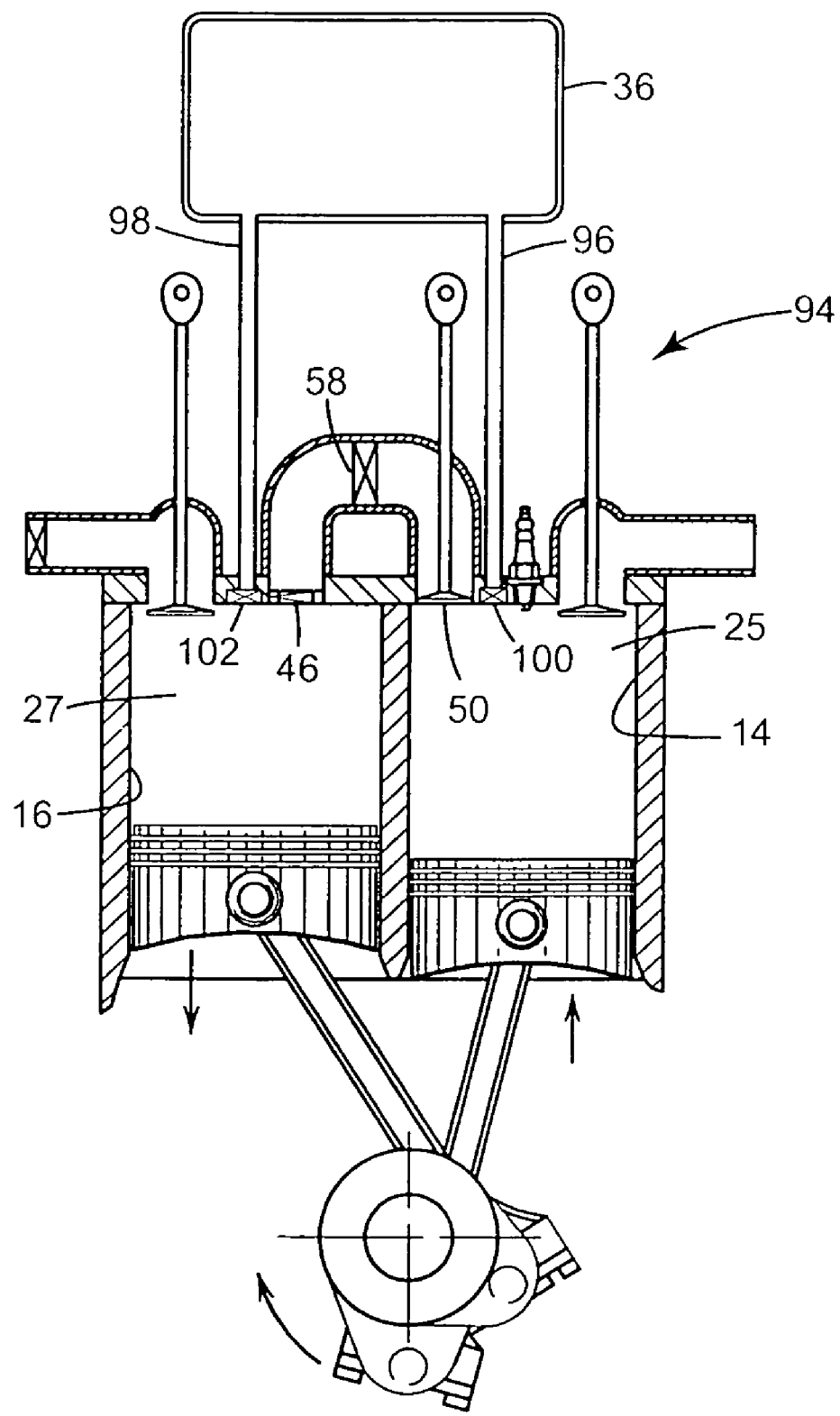
FIG. 6 is a view similar to FIG. 3 showing a sixth embodiment having the reservoir in parallel with the crossover passage and separately valved between the cylinders.

FIG. 6 discloses a sixth embodiment of engine 94 that is most similar to engine 80 of FIG. 3. Engine 94 differs in that the air reservoir 36 is separated from direct connection with the crossover passage 76, which remains controlled by check valve 46, solenoid valve 58 and outlet valve 50. The air reservoir 36 is connected in parallel with the crossover passage 76 by first and second reservoir runners (or passages) 96, 98, respectively connecting the reservoir directly to the combustion chamber 25 of the first cylinder 14 and the compression chamber 27 of the second cylinder 16. Fourth and fifth solenoid control valves 100, 102 respectively control flow between the runners 96, 98 and the cylinders 14, 16.

Operation of the described exemplary embodiments of split-cycle air hybrid engines according to the invention will now be discussed for purposes of explanation and not of limitation, it being understood that additional methods and variations will be apparent that should properly fall within the intended scope of the invention.

Basically, split-cycle air hybrid engines of the present invention are typically operable in at least three modes, an internal combustion engine (ICE) mode, an air compressor (AC) mode and a pre-compressed air power (PAP) mode. The PAP mode preferably includes a pre-compressed combustion-air power (PCA) mode wherein pre-compressed air and fuel are mixed shortly after the power piston reaches its top dead center position during an expansion stroke and then the fuel/air mixture is combusted to drive the power piston down during the same expansion stroke. Alternatively, the PAP mode could also include various forms of air motoring (AM) modes (as previously exemplified herein) wherein pre-compressed air is utilized to provide an expansion stroke without combustion. As will be discussed in greater detail, because the split-cycle air hybrid of the present invention has separate dedicated compression and power cylinders, the three modes, ICE, AC and PAP, can be run either serially or in parallel as desired.

The ICE mode is basically the normal operating mode of the engines disclosed in the previously mentioned Scuderi patents. The intake, compression, power and exhaust strokes of a conventional piston engine cycle are split between the compression and power cylinders of the split-cycle engine.

Referring to the embodiment of FIG. 1, split cycle engines as described in the Scuderi U.S. Pat. Nos. 6,543,225, 6,609, 371 and 6,952,923 include structural parameters that are advantageous over prior art split-cycle engines. Many of these advantages will be described in relation to the following discussion of the ICE mode of the engine 10. It is important to note that the air reservoir 36 of FIG. 1 performs the combined functions of both the separated crossover (or gas) passage 76 and air reservoir 36 of subsequent FIGS. 2-6.

In the ICE mode, the intake solenoid valves 56, 58 remain open. On the intake stroke, intake valve 52 opens as the compression piston moves down, drawing in air to the compression chamber 27. On the compression stroke, the intake valve 52 closes and the piston 26 moves up, compressing the air and forcing it through the check valve 46 and the inlet port 38 into the air reservoir 36.

The power piston 24 leads the compression piston 26 by a phase angle 31 that is substantially greater than 0 degrees of rotation of the crankshaft. The phase angle 31 as defined herein is the degrees of crank angle (CA) rotation the crankshaft 18 must rotate after the power piston 24 has reached its top dead center (TDC) position in order for the compression piston 26 to reach its respective TDC position. In the particular embodiment illustrated in FIG. 1, the magnitude of the angle between the first and second crank throws 28 and 30 is equal to the phase angle 31. Preferably this phase angle is between 10 and 40 degrees CA and more preferably between 20 and 30 degrees CA. The phase angle 31 is sized such that as the compression piston 26 ascends toward its TDC position and the power piston descends from its TDC position, a substantially equal mass of compressed air is transferred into and out of the air reservoir 36 (in subsequent FIGS. 2-6 a substantially equal mass of compressed air is transferred into and out of the gas passage 76).

On the power stroke, outlet (or crossover) valve 50 is typically open at TDC of the power piston 24. Preferably the outlet valve 50 is opened within a range of 10 to 0 degrees CA before TDC of the power piston 24, and more preferably within a range of 7 to 3 degrees CA before TDC of the power piston. The outlet valve 50 is preferably closed within a range of 10 to 40 degrees CA after TDC of the power piston 24, and more preferably closes within a range of 20 to 30 degrees CA after TDC of the power piston.

The power piston 24 descends from its TDC position toward a combustion ignition position, which is typically within a range of 5 to 40 degrees CA after TDC and more preferably within a range of 10 to 30 degrees CA after TDC. Fuel may be injected and mixed with the compressed air by at least two methods, i.e., either in the air reservoir 36 just up stream of the outlet valve 50 (port fuel injection), or directly into the power cylinder 14 (direct injection). Once the power piston 24 reaches its combustion ignition position, the fuel/air mixture is ignited by spark plug 72 (or compression ignition if a diesel engine), forcing the piston 24 down to BDC and delivering power to the crankshaft 18. The pressure at which combustion ignition occurs is the ignition (or firing) condition pressure.

On the exhaust stroke, the exhaust valve 54 opens and crossover valve 50 is closed. As the power piston 24 moves upward from BDC to TDC, the spent exhaust gases are forced out of the combustion chamber 25 through the exhaust port 44.

The intake and compression strokes for a pressure/volume cycle within the engine take place during the same crankshaft revolution as the power and exhaust strokes of the cycle, except that the power and exhaust strokes are advanced by the fixed phase angle 31. Thus a new pressure/volume cycle is completed each revolution of the engine crankshaft instead of in two revolutions as in a conventional four-stroke engine. However, the inlet valve 46 and outlet valve 50 maintain the gas pressure within the air reservoir 36 at or above ignition (or firing) condition pressure during the entire four-stroke cycle.

One of the basic differences between the Scuderi Split-Cycle and the prior art is the parameter that pressure in the gas passage is maintained at or above the firing condition pressure during all four strokes of the Otto cycle combined with the parameter that ignition in the power cylinder occurs substantially after top dead center (i.e., more than 5 degrees and preferably more than 10 degrees ATDC). This sets up a condition where the combustion event (or flame speed) is very fast (occurring within 24 degrees CA or less), and the NOx emissions output is very low (50 to 80 percent less than a conventional engine). Another unique aspect of the Scuderi Split-Cycle, not found in the prior art, is that the centerline of the power and compression cylinders are offset from the crankshaft axis. This enables the piston skirt to cylinder wall friction to be substantially reduced. All three of these advantageous features (maintaining firing condition pressures in the gas passage, firing after top dead center, and the offsets) are disclosed and claimed in the Scuderi Patents.

In addition to the above parameters, several other parameters have also been identified in the Scuderi Patents, which have a significant effect on engine efficiency. These parameters include:

1. Maintaining the compression and expansion ratios equal to or greater than 26 to 1, preferably equal to or greater than 40 to 1, and more preferably equal to or greater than 80 to 1;
2. The crossover valve duration (amount of crank angle (CA) rotation needed to open and close valve 50) should be equal to or less than 69 degrees, preferably less than 50 degrees, and more preferable less than 35 degrees; and
3. The crossover valve 50 should be open for a small percentage of time after combustion is initiated in the power cylinder.

During braking of a vehicle driven by an engine 10, the engine is switched to operation in the air compressor (AC) mode. Fuel injection is stopped and the solenoid valve 58 is closed, preventing air flow through the outlet port 40 and suspending power delivery from the power piston 24, thus placing the power piston 24 in an idle mode. However, the compression piston continues to operate, driven by the inertia of the moving vehicle, and to pump the compressed air into the air reservoir 36. The pumping action effectively slows, or brakes, the vehicle and the braking action becomes increasingly effective as the reservoir air pressure increases. The increased pressure in the reservoir is retained for later use in the PAP mode.

While in AC mode, the exhaust valve 54 may be held open to reduce idling losses on the power piston 24. Moreover, the power piston could be used to increase the braking effect in various ways, such as by altering the valve timing and operation to draw in and compress further air into the air reservoir. Alternatively (to keep the air reservoir clean), the piston 24 could be used as a conventional compression brake, drawing in air on the downstroke, compressing it on the upstroke and opening the exhaust valve 54 near top dead center (TDC) to discharge the compressed air and dissipate its energy. This could increase braking and reduce brake wear but would limit the recovery of energy from the compressed air in the PCA or AM modes.

Referring still to FIG. 1, the preferred third mode of operation is pre-compressed combustion air (PCA) which, from prior AC operation, has stored compressed air in the reservoir 36 at a higher pressure than generally occurs in ICE operation. The engine has at least slowed down and is ready to be accelerated. To run the PCA mode, the outlet solenoid valve 58 is opened and spark ignition and fuel injection functions are reactivated. Also, the compression piston is idled by holding open both the intake valve 52 and the intake solenoid valve 56 so that the compression piston 26 moves freely without resistance and no air is compressed or added to the reservoir 36.

If valve 52 is not independently adjustable, the compression piston 26 may also be placed in idle mode by closing solenoid valve 56. In this way the compression piston alternately compresses and expands the gas trapped in the cylinder. The compression and expansion of the trapped gas alternates the negative and positive work done on the crankshaft by the piston. Since the negative and positive work is approximately equal, the net work done on the crankshaft by the piston operating in this mode is negligible. Still another method of placing the compression piston in idle mode is to prevent the compression piston 26 from reciprocating by operatively disconnecting it from the crankshaft 18. In any of the above examples of the compression piston's idle mode, the total amount of net negative work done on the crankshaft is negligible.

Shortly after or just prior to TDC of the power piston 24, as in ICE operation, the reservoir outlet valve 50 opens, forcing a charge of compressed air (preferably controlled and with added fuel) from the reservoir 36 into the combustion chamber. Within a range of 5 to 40 degrees CA after TDC, and preferably within a range of 10 to 20 degrees CA after TDC, the fuel is quickly ignited and burns on the power stroke, providing power to the crankshaft. Exhaust products are discharged on the exhaust upstroke and the cycle is repeated.

As the vehicle is accelerated and returns to normal operation, the stored high pressure air continues to be used for combustion in the power cylinder 14 until the pressure drops to a normal operating pressure and the engine is returned to full ICE operation. However, operation in PCA mode as long as possible increases operating efficiency because compression energy from braking is returned to the PCA power cycle while the compressor piston 26 is idling using very little energy. Thus the vehicle braking compression energy is used to provide compression energy in the PCA power mode.

If the engine is stopped, stored compression energy can be used to start the engine, and the vehicle if desired, until a minimum speed is reached, whereupon the engine may be returned to ICE operation. However, a backup electric starter may be desirable.

Referring again to FIG. 2, operation of the engine 72 is similar to that of engine 10 (FIG. 1). However, use of the small volume crossover passage 76 for flow between cylinders substantially avoids flow through the air reservoir 36 during ICE operation and potentially reduces undesirable pressure variations in the gas passage 76 that could adversely affect engine performance.

In the embodiment of FIG. 3, the addition of the solenoid valve 82 at the reservoir connection with the crossover passage 76 allows cutting off the reservoir to maintain a higher or lower pressure therein while the smaller crossover passage 76 can operate with rapidly changing pressures in normal ICE engine operation for a split cycle engine.

In FIG. 4, the replacement of the air reservoir with an accumulator 86 allows the storage of a range of air volumes at a relatively constant pressure for use, primarily, in controlling air charge volumes delivered to the combustion chamber by controlling only the outlet valve 50 opening time.

The use of a common air reservoir, or accumulator, as in FIG. 5, may reduce manufacturing costs. Although the common air reservoir is illustrated in FIG. 5 as connected directly to the gas passages, one skilled in the art would recognize that the air reservoir may be configured to connect to the split-cycle engine in other ways. For example, the common air reservoir may be an integral part of the gas passage as in FIG. 1, or may be connected in parallel with the gas passage as in FIG. 6.

The embodiment of FIG. 6 further separates the effects of the air reservoir 36 on pressures in the crossover passage 76 and allows more complete separation of operation in the ICE mode from either the AC mode or the PCA mode.

Referring to FIGS. 1-6 in general, a distinct advantage of the present invention is that air hybrid systems utilizing a split-cycle engine 10, 74, 80, 84, 89 and 94 can function in the various operating modes (ICE, AC and PAP) simultaneously (or in parallel) over the paired compression cylinders 16 and power cylinders 14, rather than being restricted to operating each mode serially out of a single cylinder. This parallel mode ability inherently provides added capabilities and expanded applications for split-cycle air hybrid systems.

Referring now to FIG. 3 as an example, under part load conditions the engine 80 can simultaneously operate in the ICE mode while continuously charging the air reservoir in the AC mode. That is, a full charge of air may be made to enter the compression cylinder 16 on an intake stroke where it is compressed and forced into gas passage 76. However, only a fraction of the air charge is required to operate the ICE mode under part load conditions. Accordingly, only a portion of the charge may be routed to the power cylinder 14 while the remainder of the charge can be diverted to the air reservoir 36 to keep it fully charged. In this way, split-cycle air hybrid systems have the ability to continuously charge their air reservoirs under part load conditions.

Additionally, in much the same fashion, waste energy from exhaust gas can be re-circulated, either directly or through a turbocharger, back into the intake of a split-cycle air hybrid engine 80 to be stored as compressed air energy in the air reservoir 36. Advantageously, this technique of recovering exhaust gas energy while operating under part load conditions can also be utilized in stationary applications, e.g., in stationary generators.

Although the invention has been described by reference to certain specific embodiments, it should be understood that numerous changes may be made within the spirit and scope of the inventive concepts disclosed. Accordingly, it is intended that the invention not be limited to the described embodiments, but that it have the full scope defined by the language of the following claims.

What is claimed is:

1. A split-cycle air hybrid engine comprising:
a crankshaft rotatable about a crankshaft axis;
a power piston slidably received within a power cylinder and operatively connected to the crankshaft such that the power piston reciprocates through an expansion stroke and an exhaust stroke during a single rotation of the crankshaft, the power cylinder being selectively controllable to place the power piston in a power mode or an idle mode;
a compression piston slidably received within a compression cylinder and operatively connected to the crankshaft such that the compression piston reciprocates through an intake stroke and a compression stroke during a single rotation of the crankshaft, the compression cylinder being selectively controllable to place the compression piston in a compression mode or an idle mode;
an air reservoir operatively connected between the compression cylinder and the power cylinder and selectively operable to receive compressed air from the compression cylinder and to deliver compressed air to the power cylinder for use in transmitting power to the crankshaft during engine operation; and
valves selectively controlling gas flow into and out of the compression and power cylinders and the air reservoir such that the engine is operable in at least three modes, including an internal combustion engine (ICE) mode, an air compressor (AC) mode and a pre-compressed air power (PAP) mode, and wherein:
in the ICE mode, the compression piston and power piston are in their respective compression and power modes, in that the compression piston draws in and compresses inlet air for use in the power cylinder, and compressed air is admitted to the power cylinder with fuel, at the beginning of an expansion stroke, which is ignited, burned and expanded on the same expansion stroke of the power piston, transmitting power to the crankshaft, and the combustion products are discharged on the exhaust stroke;
in the AC mode, the compression piston is in the compression mode and draws in and compresses air which is stored in the reservoir for later use in the power cylinder; and
in the PAP mode, the power piston is in the power mode and receives compressed air from the reservoir which is expanded on the expansion stroke of the power piston, transmitting power to the crankshaft, the expanded air is discharged on the exhaust stroke, and compressed air from the compression cylinder is not received in the air reservoir.

2. An engine as in claim 1 wherein, in the PAP mode, fuel is mixed with the compressed air at the beginning of an expansion stroke and the mixture is ignited, burned and expanded on the same expansion stroke of the power piston, transmitting power to the crankshaft, and the combustion products are discharged on the exhaust stroke.

3. An engine as in claim 2 wherein, in the PAP mode, fuel is ignited within a range of 5 to 40 degrees crank angle (CA) after the power piston has reached its top dead center (TDC) position.

4. An engine as in claim 3 wherein, in the PAP mode, fuel is ignited within a range of 10 to 30 degrees crank angle (CA) after the power piston has reached its top dead center (TDC) position.

5. An engine as in claim 1 wherein, in the PAP mode, the compressed air admitted to the power cylinder is expanded without adding fuel or initiating combustion.

6. An engine as in claim 1 wherein the air reservoir comprises a gas passage sized to receive and store compressed air from a plurality of compression strokes, the gas passage interconnecting the compression and power cylinders, the gas passage including an inlet valve and an outlet valve defining a pressure chamber therebetween.

7. An engine as in claim 1 including a gas passage interconnecting the compression and power cylinders, the gas passage including an inlet valve and an outlet valve defining a pressure chamber therebetween;
wherein the air reservoir is connected by a reservoir passage to the pressure chamber at a location between the inlet valve and the outlet valve.

8. An engine as in claim 7 including a reservoir control valve in the reservoir passage.

9. An engine as in claim 8 wherein the air reservoir is an accumulator adapted to maintain a relatively constant pressure therein within a predetermined pressure range.

10. An engine as in claim 7 including multiple pairs of compression and power cylinders interconnected by gas passages having pressure chambers, wherein the pressure chambers are all connected with a common air reservoir.

11. An engine as in claim 1 including a gas passage interconnecting the compression and power cylinders, the gas passage including an inlet valve and an outlet valve defining a pressure chamber therebetween;
the air reservoir being connected in parallel with the gas passage with inlet and outlet connections from the air reservoir to the compression and power cylinders.

12. An engine as in claim 1 wherein, in the ICE mode, fuel is ignited within a range of 5 to 40 degrees crank angle (CA) after the power piston has reached its top dead center (TDC) position.

13. An engine as in claim 12 wherein, in the ICE mode, fuel is ignited within a range of 10 to 30 degrees crank angle (CA) after the power piston has reached its top dead center (TDC) position.

14. An engine as in claim 1 wherein the engine is operable in the ICE mode and the AC mode simultaneously.

15. An engine as in claim 1 wherein, during one of the ICE mode and the PAP mode, fuel is ignited within a range of 5 to 40 degrees CA after the power piston reaches its TDC position.

16. An engine as in claim 15 wherein, during one of the ICE mode and the PAP mode, fuel is ignited within a range of 10 to 30 degrees CA after the power piston reaches its TDC position.

17. An engine as in claim 1 wherein a compression ratio and an expansion ratio of the engine is equal to or greater than 26 to 1.

18. An engine as in claim 1 wherein a compression ratio and an expansion ratio of the engine is equal to or greater than 40 to 1.

19. An engine as in claim 1 wherein a compression ratio and an expansion ratio of the engine is equal to or greater than 80 to 1.

20. A split-cycle air hybrid engine comprising:
a crankshaft rotatable about a crankshaft axis;
a power piston slidably received within a power cylinder and operatively connected to the crankshaft such that the power piston reciprocates through an expansion stroke and an exhaust stroke during a single rotation of the crankshaft;
a compression piston slidably received within a compression cylinder and operatively connected to the crankshaft such that the compression piston reciprocates through an intake stroke and a compression stroke during a single rotation of the crankshaft;
a gas passage interconnecting the compression and power cylinders, the gas passage including an inlet valve and an outlet valve defining a pressure chamber therebetween; and
an air reservoir connected by a first reservoir passage directly to the power cylinder and a second reservoir passage directly to the compression cylinder, the air reservoir separated from direct connection with the crossover passage and connected in parallel therewith, the air reservoir selectively operable to receive compressed air from the compression cylinder and to deliver compressed air to the power cylinder for use in transmitting power to the crankshaft during engine operation.

21. An engine as in claim 20 including a first reservoir control valve in the first reservoir passage and a second reservoir control valve in the second reservoir passage.

22. An engine as in claim 20 wherein the engine is operable in at least three modes, including an internal combustion engine (ICE) mode, an air compressor (AC) mode and a pre-compressed air power (PAP) mode wherein:
in the ICE mode, the compression piston draws in and compresses inlet air for use in the power cylinder, and the inlet air is admitted to the power cylinder with fuel, at the beginning of an expansion stroke, which is ignited, burned and expanded on the same expansion stroke of the power piston;
in the AC mode, the compression piston draws in and compresses air which is stored in the air reservoir for later use in the power cylinder; and
in the PAP mode, the power cylinder receives stored reservoir air from the air reservoir, and the reservoir air is admitted to the power cylinder with fuel, at the beginning of an expansion stroke, which is ignited, burned and expanded on the same expansion stroke of the power piston.

23. An engine as in claim 22 wherein, during one of the ICE mode and the PAP mode, fuel is ignited within a range of 5 to 40 degrees CA after the power piston reaches its TDC position.

24. An engine as in claim 23 wherein, during one of the ICE mode and the PAP mode, fuel is ignited within a range of 10 to 30 degrees CA after the power piston reaches its TDC position.

25. An engine as in claim 22 wherein the engine is operable in the ICE mode and the AC mode simultaneously.

26. A split-cycle air hybrid engine comprising:
a power piston slidably received within a power cylinder and operatively connected to a crankshaft such that the power piston reciprocates through an expansion stroke and an exhaust stroke during a single rotation of the crankshaft;
a compression piston slidably received within a compression cylinder and operatively connected to the crankshaft such that the compression piston reciprocates through an intake stroke and a compression stroke during a single rotation of the crankshaft;
an air reservoir operatively connected between the compression cylinder and the power cylinder and operable to receive compressed air from the compression cylinder and to deliver compressed air to the power cylinder for use in transmitting power to the crankshaft during engine operation; and valves to control gas flow into and out of the compression and power cylinders and the air reservoir, wherein:

the power cylinder is selectively operable to place the power piston in the following modes:

a power mode, wherein compressed air from the air reservoir or the compression cylinder is delivered, with or without fuel, to the power cylinder; and an idle mode, wherein compressed air from the air reservoir or the compression cylinder is not delivered to the power cylinder.

27. An engine according to claim 26, wherein the compression cylinder is selectively operable to place the compression piston in the following modes:

a compression mode, wherein compressed air is received in the air reservoir or the power cylinder from the compression cylinder; and an idle mode, wherein compressed air from the air reservoir or the compression cylinder is not delivered to the power cylinder.

28. An engine according to claim 27, further comprising:

a control mechanism operable to select any one of at least two of the following modes of operation of the engine:

internal combustion engine mode, wherein at least some compressed air from the compression cylinder is delivered, with fuel, to the power cylinder;

air compressor mode, wherein compressed air from the compression cylinder is received in the air reservoir but compressed air from the air reservoir is not delivered to the power cylinder; and pre-compressed air power mode, wherein compressed air from the air reservoir is delivered, with or without fuel, to the power cylinder but compressed air from the compression cylinder is not received in the air reservoir.

29. An engine according to claim 28, wherein the control mechanism comprises:

a reservoir outlet control valve, operatively connected between the air reservoir and the power cylinder, and operable to control the flow of compressed air from the air reservoir to the power cylinder; and an intake control valve, located in a compression cylinder intake port, and operable to control the air drawn into the compression cylinder.

30. An engine according to claim 29, wherein the control mechanism further comprises a control unit to selectively and independently operate the reservoir outlet control and intake control valves.

31. An engine according to claim 29, configured such that when operating in the pre-compressed air power mode, fuel is mixed with the compressed air delivered to the power cylinder at the beginning of an expansion stroke and the mixture is ignited, burned and expanded on the said expansion stroke of the power piston, transmitting power to the crankshaft, and the combustion products are discharged on the following exhaust stroke.

32. An engine according to claim 29, configured such that when operating in the pre-compressed air power mode, the compressed air delivered to the power cylinder is expanded without adding fuel or initiating combustion.

33. An engine according to any claim 27, further including a gas crossover passage interconnecting the compression and power cylinders, the gas crossover passage including an inlet valve and an outlet valve defining a pressure chamber therebetween, the valves being independently operable.

34. An engine according to claim 33, wherein the air reservoir is connected to the gas crossover passage through a reservoir control valve.

* * * * *